United States Patent
Seo et al.

(10) Patent No.: US 10,523,336 B2
(45) Date of Patent: Dec. 31, 2019

(54) APPARATUS AND METHOD FOR RESETTING TRANSIMPEDANCE AMPLIFIER FOR LOW-POWER PASSIVE OPTICAL NETWORK EQUIPMENT

(71) Applicant: ZARAM TECHNOLOGY CO., LTD., Seongnam-si, Gyeonggi-do (KR)

(72) Inventors: In Shik Seo, Seoul (KR); Joon Hyun Baek, Seongnam-si (KR); Sung Hoon Park, Yongin-si (KR)

(73) Assignee: ZARAM TECHNOLOGY CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/121,569

(22) Filed: Sep. 4, 2018

(65) Prior Publication Data

US 2019/0074910 A1 Mar. 7, 2019

(30) Foreign Application Priority Data

Sep. 5, 2017 (KR) .................. 10-2017-0113116

(51) Int. Cl.
| | | |
|---|---|---|
| *H04B 10/60* | (2013.01) | |
| *H04B 10/69* | (2013.01) | |
| *H04B 10/27* | (2013.01) | |
| *H04L 7/00* | (2006.01) | |
| *H04B 10/272* | (2013.01) | |

(52) U.S. Cl.
CPC ............ *H04B 10/69* (2013.01); *H04B 10/27* (2013.01); *H04B 10/272* (2013.01); *H04B 10/693* (2013.01); *H04L 7/0075* (2013.01)

(58) Field of Classification Search
CPC ...... H04B 10/27; H04B 10/69; H04B 10/693; H04L 7/0075; H04Q 11/0067
See application file for complete search history.

(56) References Cited

U.S. PATENT DOCUMENTS 10,277,314 B2 * 4/2019 Tebbe .............. H04B 10/07953
2002/0063932 A1 * 5/2002 Unitt .................. H04B 10/272
398/168
(Continued)

FOREIGN PATENT DOCUMENTS

KR 101234311 B1 2/2013

OTHER PUBLICATIONS

ETSI EN 302 769 V1.1.1, "Digital Video Broadcasting (DVB); Frame structure channel coding and modulationfor a second generation digital transmission system for cable systems (DVB-C2)", ETSI (Apr. 2010).

*Primary Examiner* — Tanya T Motsinger
(74) *Attorney, Agent, or Firm* — Rabin & Berdo, P.C.

(57) ABSTRACT

Provided are an apparatus and a method for resetting a transimpedance amplifier for low-power passive optical network equipment for improving the synchronization performance of an uplink burst signal by resetting the transimpedance amplifier for amplifying a received signal of an optical transceiver at a time point at which a frame of the uplink burst signal ends. There is an effect of improving the burst-mode clock and data reconstruction performance through simple analysis of a bit pattern and thus reducing a guard time or a number of repetitions of preambles by accurately identifying the time point at which the frame of the uplink burst signal ends without using a frame data analysis scheme to reset the transimpedance amplifier.

12 Claims, 16 Drawing Sheets

(56) References Cited

U.S. PATENT DOCUMENTS

| | | | |
|---|---|---|---|
| 2002/0080444 A1* | 6/2002 | Phillips | H04B 10/272 398/79 |
| 2003/0091045 A1* | 5/2003 | Choi | H04Q 11/0067 370/390 |
| 2005/0163149 A1* | 7/2005 | Unitt | H04Q 11/0067 370/442 |
| 2008/0205906 A1* | 8/2008 | Murata | H03F 3/08 398/208 |
| 2008/0310861 A1* | 12/2008 | Wong | H03K 5/084 398/210 |
| 2009/0279886 A1* | 11/2009 | Suvakovic | H04L 7/042 398/26 |
| 2010/0021160 A1* | 1/2010 | Wakayama | H04Q 11/0067 398/45 |
| 2010/0321072 A1* | 12/2010 | Bauwelinck | H04L 5/22 327/142 |
| 2011/0255866 A1* | 10/2011 | Van Veen | H04B 10/07955 398/35 |
| 2011/0311235 A1* | 12/2011 | Li | H04J 3/0608 398/182 |
| 2012/0141139 A1* | 6/2012 | Bakhru | H04B 10/272 398/158 |
| 2013/0094861 A1* | 4/2013 | Luo | H04J 14/0278 398/68 |
| 2014/0023367 A1 | 1/2014 | Li et al. | |
| 2018/0183443 A1* | 6/2018 | Tebbe | H04L 7/0075 |
| 2019/0074910 A1* | 3/2019 | Seo | H04B 10/27 |
| 2019/0081700 A1* | 3/2019 | Tebbe | H04B 10/07953 |

\* cited by examiner

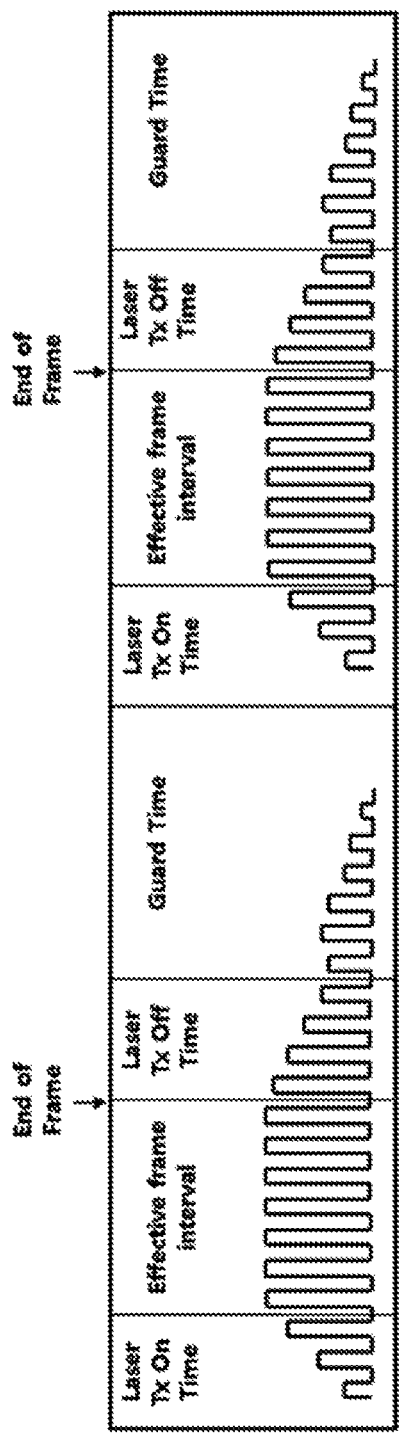
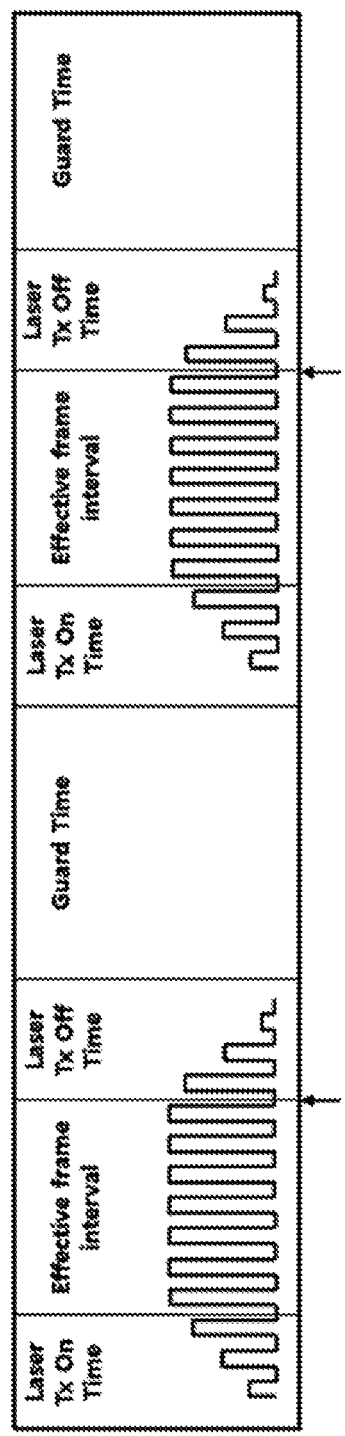
FIG. 12A
FIG. 12B

APPARATUS AND METHOD FOR RESETTING TRANSIMPEDANCE AMPLIFIER FOR LOW-POWER PASSIVE OPTICAL NETWORK EQUIPMENT

CROSS-REFERENCE TO RELATED APPLICATIONS

This application is based on and claims the benefit of priority to Korean Patent Application No. 10-2017-0113116 filed on Sep. 5, 2017, with the Korean Intellectual Property Office, the disclosure of which is incorporated herein by reference.

BACKGROUND OF THE INVENTION

Field of the Invention

The present disclosure relates to an apparatus and a method for resetting a Transimpedance Amplifier (TIA) for low-power Passive Optical Network (PON) equipment, and more particularly to an apparatus and a method for resetting a transimpedance amplifier for low-power passive optical network equipment which reset the transimpedance amplifier for amplifying a received signal of an optical transceiver at a time point at which a frame of an uplink burst signal ends so as to improve synchronization performance of the uplink burst signal and save power.

Description of the Prior Art

Passive Optical Network (PON) technology configures a high-speed subscriber network in which simultaneous access by a plurality of subscribers may be processed through a time-division scheme or wavelength-division scheme. Among such schemes, the time-division scheme, which is cost-effective, is mainly used, and representatively includes Ethernet PON (EPON) or 10-Gigabit EPON (10G-EPON) based on Institute of Electrical and Electronics Engineers (IEEE) 802.3av/ah, Gigabit PON (GPON) or 10-Gigabit PON (XGPON) based on International Telecommunication Union-Telecommunication Standardization Sector (ITUT) G.984/7, or Next-Generation PON (NGPON2) based on G.989.

In the configuration of the PON, one Optical Line Terminal (OLT) installed in a telephone office and Optical Network Terminals (ONTs) or Optical Network Units (ONUs) of a plurality of subscribers have a Point-to-Multipoint network structure through a remote node (using an optical splitter), which is a passive optical splitting device.

FIG. 1 illustrates the configuration of the general PON in which an OLT 1 including an optical transceiver 1a for mutually converting an electric signal and an optical signal is connected to a plurality of subscriber ONTs 2 through a Remote Node (RN) and in which each of the ONTs 2 includes an optical transceiver 2a. Through this configuration, a high-speed communication service can be provided to the plurality of subscriber ONTs 2.

FIG. 2 illustrates the configuration in which an OLT repeater 3 is used to extend the transmission distance of the PON. In the structure of the general PON illustrated in FIG. 1, since the transmission distance between the OLT 1 of the telephone office and the subscriber ONT 2 is generally about 20 km, it frequently becomes impossible to provide service due to the lack of subscribers within a transmission distance limit of 20 km in cases other than that of a big city, and thus a method of configuring the OLT repeater 3 and extending the transmission distance has been used. Of course, telephone offices can be installed in several places, branch offices can be installed, or an optical repeater for amplifying an optical signal can be installed, but the OLT repeater 3 is mainly used from the aspect of cost-effectiveness.

FIGS. 3A and 3B are diagrams illustrating a downlink signal transmission scheme and an uplink signal transmission scheme in the PON. FIG. 3A is a conceptual diagram illustrating a downlink signal transmission scheme of the passive optical network. As illustrated in FIG. 3A, when the OLT 1 successively transmits downlink frame data to be transmitted to the ONTs 2, a plurality of ONTs 2_1 and 2_2 selectively receive frame data therefor from among the downlink frame data. Accordingly, in the case of downlink signals, successive data transmission is possible without signal collision only though successive transmission of signals modulated by a clock of the OLT 1. Further, all of the downlink signals including such consecutive data use the clock of the OLT 1, so that each ONT 2 reconstructs the clock for the downlink signals only once and synchronizes the same.

However, in the case of uplink signals through which the ONT 2 transmits uplink frame data to the OLT 1, when the plurality of ONTs 2_1 and 2_2 transmits uplink signals, the signals are likely to collide with each other. Accordingly, if the OLT 1, which is aware of information (number or distance) on the ONTs 2, transmits control information on the time point at which an uplink signal is transmitted by each ONT 2 and the amount of data through the downlink signals, each ONT 2_1 or 2_2 may generate an uplink burst signal having various sizes based on the corresponding control information and transmit the uplink burst signal without collision.

FIG. 3B is a conceptual diagram illustrating an uplink signal transmission scheme of the passive optical network. As illustrated in FIG. 3B, the ONTs 2_1 and 2_2 generate uplink signals having amounts of data predetermined at different time points and transmit the generated uplink signals to the OLT 1, wherein the uplink signals are separated by a guard interval a in order to prevent collision therebetween.

The uplink signals are burst signals continuously segmented as illustrated in FIG. 3B. Each signal uses its own clock of the ONT 2_1 or 2_2, so that clocks of the uplink burst signals are not synchronized with each other or with OLT clocks, and thus there is variation from the clock of the OLT 1 receiving the uplink burst signals.

That is, in FIG. 3B, since clocks of individual start points t1, t2, and t3 of the uplink burst signals differ from the clock of the OLT 1, the OLT 1 is required to reconstruct the clock for the uplink burst signal every time and reconstruct data according to the reconstructed clock.

Particularly, the uplink burst signals transmitted by the ONTs 2 at different locations are received by photo diodes within the optical transceiver of the OLT or the OLT repeater while being segmented with different sizes, so that an amplification rate of the transimpedance (TIA) for converting a value of current generated by the photo diodes into a voltage value and amplifying the voltage should be variable. Further, due to the influence of capacitance within a circuit, the signal remains for a considerable period of time without being completely removed even though frame transmission is finished, and a burst-mode clock and data reconstruction process using the output of the transimpedance amplifier, which includes many noise signals, is very difficult, and it takes a lot of time due to the residual current.

Accordingly, in the case of commercial products, a guard time between uplink burst signals is configured to be long and a preamble of a transmitted frame is excessively repeatedly inserted (for example, a 64-bit preamble is repeated scores or hundreds of times) to provide sufficient training opportunities for burst-mode clock and data reconstruction, which are causes of bandwidth reduction.

In Korean Patent Publication No. 10-2011-0063034, "Relay apparatus and relay method for gigabit passive optical network", optical signals transmitted through an optical repeater are converted into electrical signals, the corresponding signals are modulated, and then frame data is analyzed. That is, control information on uplink burst signals are identified, and the transmitted uplink burst signals are reconstructed and modulated according to the corresponding control information, so that the burst-mode clock and data reconstruction process is improved. However, in this case, in order to reconstruct the transmitted signals, the frame should be modulated and control information on the uplink burst signals should be identified, and thus it is necessary to analyze all frame signals. As a result, the configuration needs a high-performance FPGA, which provides a complex logic function, or a dedicated ASIC and thus cannot be applied to the OLT or to the OLT repeater, which lack separate frame data analysis means (MAC).

In Korean Patent Registration No. 10-1078052, "Apparatus and method for reconstructing received data in passive optical communication network", it is possible to improve burst-mode clock and data reconstruction performance and thus reduce a guard time by managing the time point at which a frame ends, which is transmitted through a burst signal, as burst signal arrival time information for burst-mode clock and data reconstruction and by resetting an optical receiver at the time point at which the signal arrives. This scheme is also impossible to apply to the OLT repeater for simply relaying uplink signals since an allocated bandwidth manager of the OLT for allocating transmission start time information of the uplink signals is required to manage frame end time points of all uplink signals and thus the load on the OLT increases.

As a result, the prior arts necessarily need MAC layer processing configuration since the time point at which the received frame ends is identified through frame data analysis, which makes the configuration of the OLT repeater require a MAC chipset, like the OLT system. That is, the configuration of the repeater becomes the same as the single-port OLT system. This means that the original purpose of the repeater, which is to configure an economically efficient network, is lost. Therefore, in reality, it is difficult to apply the prior arts to the passive optical communication network, which necessarily requires the OLT repeater.

SUMMARY OF THE INVENTION

The present disclosure has been made in order to solve the above-mentioned problems with the prior art, and an aspect of the present disclosure is to provide an apparatus and a method for resetting a transimpedance amplifier for low-power passive optical network equipment capable of improving burst-mode clock and data reconstruction performance and thus reducing a guard time or a number of repetitions of preambles and saving power by accurately identifying the time point at which a frame of an uplink burst signal ends without using a frame data analysis scheme and resetting the transimpedance amplifier.

Another aspect of the present disclosure is to provide an apparatus and a method for resetting a transimpedance amplifier for low-power passive optical network equipment capable of preventing the generation of a residual signal by capacitance and thus improving burst-mode clock and data reconstruction performance by inserting information on a frame length into an appointed area of a transmitted frame, identifying the information only through detection of frame length information in the appointed area without analysis of all of the frame data, and resetting the transimpedance amplifier of an optical transceiver at the time point at which the frame ends based on the frame length information.

Another aspect of the present disclosure is to provide an apparatus and a method for resetting a transimpedance amplifier for low-power passive optical network equipment capable of easily being applied to an OLT or an OLT repeater by inserting scramble information including information on a frame length into a preamble provided as a training signal for burst-mode clock and data reconstruction to accurately identify the time point at which the frame ends only through simple detection of frame length information instead of complex analysis of frame data and resetting the transimpedance amplifier of the optical transceiver.

Another aspect of the present disclosure is to provide an apparatus and a method for resetting a transimpedance amplifier for low-power passive optical network equipment capable of providing a new function such as reducing a guard time and a preamble provision length to increase bandwidth while increasing compatibility by inserting frame length information into an uplink frame, detecting the frame length information, and identifying a frame-length-information provision mode in order to reset the transimpedance amplifier of the optical transceiver through delimiter information so as to distinguish the mode from a conventional normal mode.

In accordance with an aspect of the present disclosure, an apparatus for resetting a transimpedance amplifier for low-power passive optical network equipment is provided. The apparatus includes: a reset signal generator configured to generate a reset signal based on data bit information of a received frame reconstructed from an uplink burst signal received through an optical transceiver, wherein the reset signal generator includes: a preamble detector configured to detect a bit pattern of a preambles repeatedly inserted into the received frame; a delimiter detector configured to detect a delimiter bit pattern following the preamble of the received frame; a frame length detector configured to detect frame length information included in appointed locations of at least one of the preamble and the delimiter; and a reset determiner configured to generate a reset signal for resetting the transimpedance amplifier included in the optical transceiver at the time point at which the received frame ends based on the preamble length information and the delimiter detected by the delimiter detector.

The reset signal generator may be included in an Optical Line Terminal (OLT) or a burst-mode clock and data reconstruction unit of an OLT repeater.

The frame length information may include a frame length value coded in a preset scheme, and may further include an error correction code.

The frame length information may be inserted in a predetermined location of repetitive preambles of a preset length, the frame length information having a length equal to the preset length, or the frame length information may be alternately provided with one or more pieces of frame length information of the preambles having appointed information, the frame length information having a length equal to length of the preambles.

The frame length information may be inserted into the last 16 bits of a 64-bit delimiter.

Meanwhile, the delimiter may be distinguished by a plurality of determined values for distinguishing the case in which the frame length information is not inserted from the case in which the frame length information is inserted.

In accordance with another aspect of the present disclosure, an apparatus for resetting a transimpedance amplifier for low-power passive optical network equipment is provided. The apparatus includes: a preamble detector configured to detect a bit pattern of unit preambles repeatedly inserted into a received frame; a frame length detector located in a preamble field of the received frame and configured to detect a bit pattern of index preambles differently defined from the unit preambles, detect following frame length information, and calculate a frame length value through a frame length value included as the frame length information and an error correction code after subsequent frame length information is detected; a delimiter detector configured to detect a delimiter bit pattern of the received frame; and a reset determiner configured to, when a time point at which the received frame ends is determined using the frame length value and the location of the delimiter, detected by the delimiter detector, generate a reset signal for resetting the transimpedance amplifier of an optical transceiver.

Meanwhile, the reset determiner may verify the time point at which the received frame ends by detecting a frame end marker added to the end of the received frame, or may verify the time point at which the received frame ends by calculating a frame checksum of the received frame and comparing the frame checksum with a frame checksum value located at the time point at which the received frame ends.

In accordance with another aspect of the present disclosure, a method of resetting a transimpedance amplifier for low-power passive optical network equipment, by which, when a received uplink burst signal is converted into data bit information through a burst-mode clock and data reconstruction process, a reset signal generator generates a reset signal for resetting the transimpedance amplifier included in an optical transceiver based on the corresponding data bit information, is provided. The method includes steps of: detecting preambles in an appointed bit pattern from the reconstructed data bit information of the uplink burst signal and detecting one or more pieces of frame length information included in appointed locations before the payload of the frame; detecting delimiters in an appointed bit pattern from the reconstructed data bit information of the uplink burst signal and detecting the time point at which the frame ends by comparing a following data bit number with the detected frame length information; and generating a reset signal for resetting the transimpedance amplifier at the detected time point at which the frame ends.

The reset signal generator may be included in an OLT or a burst-mode clock and data reconstruction unit of an OLT repeater.

Meanwhile, the frame length information may include a frame length value coded in a preset scheme, and may further include an error correction code.

An index preamble different from the unit preamble may be located at a front part of the frame length information in order to indicate that the frame length information follows.

An apparatus and a method for resetting a transimpedance amplifier for low-power passive optical network equipment according to an embodiment of the present disclosure have the effect of improving the burst-mode clock and data reconstruction performance through simple analysis of a bit pattern without an increase in load for frame analysis and thus reducing a guard time or a number of repetitions of preambles and saving power by accurately identifying the time point at which the frame of the uplink burst signal ends without using a frame data analysis scheme to reset the transimpedance amplifier.

An apparatus and a method for resetting a transimpedance amplifier for low-power passive optical network equipment according to an embodiment of the present disclosure have an effect of preventing the generation of a residual signal by capacitance and thus improving burst-mode clock and data reconstruction performance by inserting information on a frame length into an appointed area of a transmitted frame, identifying the information only through detection of frame length information in the appointed area without analysis of all frame data, and resetting the transimpedance amplifier of an optical transceiver at the time point at which the frame ends based on the frame length information.

An apparatus and a method for resetting a transimpedance amplifier for low-power passive optical network equipment according to an embodiment of the present disclosure have an effect of easily being applied to an OLT or an OLT repeater by inserting scramble information including information on a frame length into a preamble provided as a training signal for burst-mode clock and data reconstruction to accurately identify the time point at which the frame ends only through simple detection of frame length information instead of complex analysis of frame data and resetting the transimpedance amplifier of the optical transceiver.

An apparatus and a method for resetting a transimpedance amplifier for low-power passive optical network equipment according to an embodiment of the present disclosure have an effect of providing a new function such as reducing a guard time and a preamble provision length to increase bandwidth while increasing compatibility by inserting frame length information into an uplink frame, detecting the frame length information, and identifying a frame-length-information provision mode to reset the transimpedance amplifier of the optical transceiver through delimiter information, so as to distinguish the mode from the conventional normal mode.

BRIEF DESCRIPTION OF THE DRAWINGS

The above and other aspects, features and advantages of the present disclosure will be more apparent from the following detailed description taken in conjunction with the accompanying drawings, in which:

FIGS. 12A and 12B are conceptual diagrams illustrating an uplink signal reception state in cases in which the present disclosure is applied and is not applied;

DETAILED DESCRIPTION OF THE EXEMPLARY EMBODIMENTS

Figure 1:
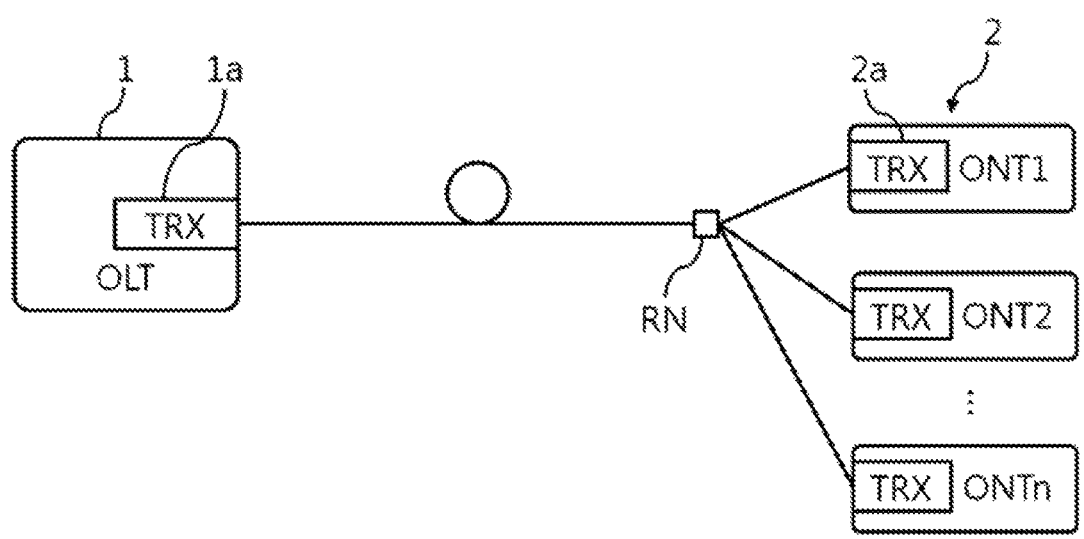
FIG. 1 illustrates the configuration of the conventional passive optical network.
Figure 2:
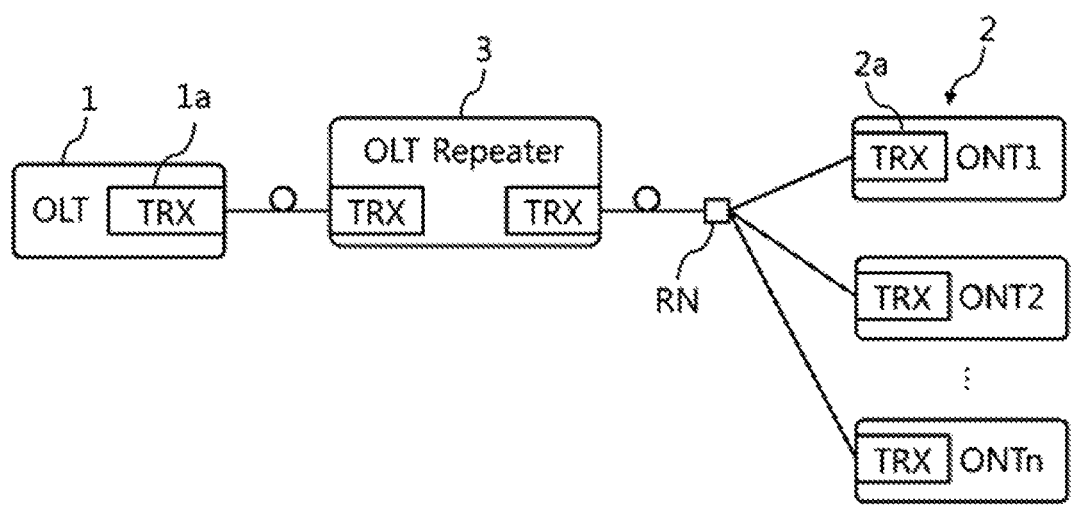
FIG. 2 illustrates an example of a transmission distance extension scheme of the conventional passive optical network.
Figure 3A:
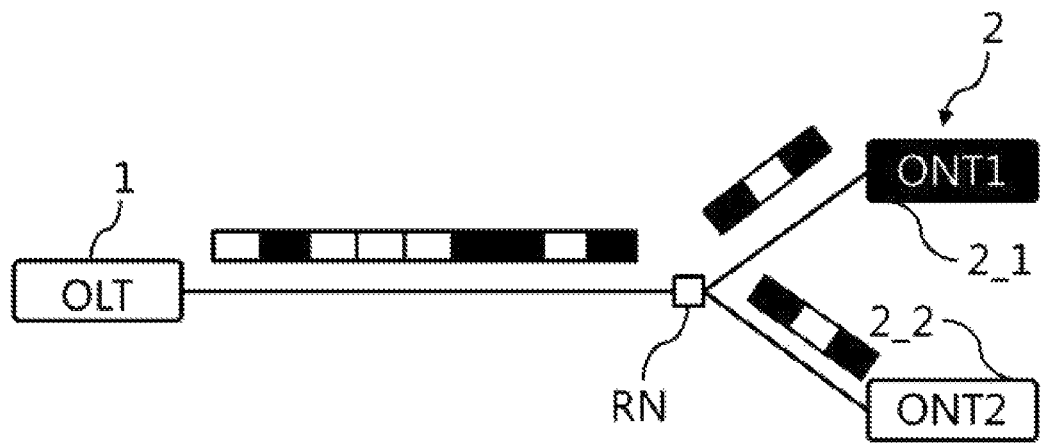
FIGS. 3A and 3B are a conceptual diagram illustrating a downlink and uplink signal transmission scheme of the passive optical network.
Figure 3B:
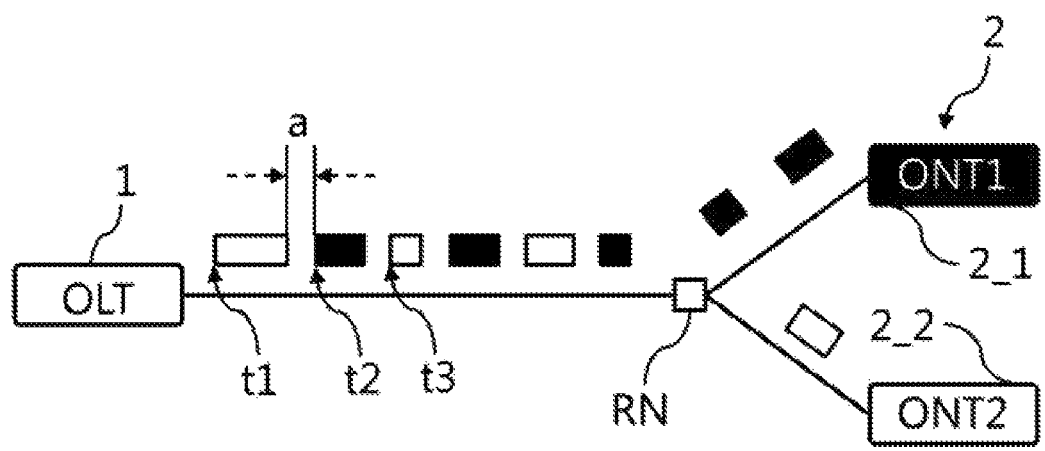

It should be noted that the technical terms in the specification are merely used for describing a specific embodiment but do not limit the present disclosure. Further, the technical terms in the present disclosure should be construed as a meaning generally understood by those skilled in the art unless the terms are defined as another meaning and should not be construed as an excessively inclusive meaning or an excessively exclusive meaning. When a technical term used in the present disclosure is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the present disclosure includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms as used herein, including ordinal numbers such as first, second, and the like, may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, exemplary embodiments of the present disclosure will be described in detail with reference to the accompanying drawings, equal or similar elements are assigned an equal reference numeral, and an overlapping description thereof will be omitted.

Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings.

Particularly, in the description of the present disclosure, an optical communication terminal on the subscriber side is referred to as an Optical Network Terminal (ONT), but is used as a term that represents an optical communication terminal on the subscriber side including an Optical Network Unit (ONU), which is conceptually the same, and thus the ONT should be understood to include other types of optical communication modems or optical communication terminal devices as well as the ONU.

Further, embodiments of the present disclosure are described through an example of a Gigabit PON (GPON) or a 10-Gigabit PON (XPON or XGPON) according to International Telecommunication Union-Telecommunication Standardization Sector (ITUT) G.984/7, but may be applied based on the same principle to various types of passive optical network systems including a Next-Generation PON (NGPON2) according to G.989, an Ethernet PON (EPON) according to Institute of Electrical and Electronics Engineers (IEEE) 802.3av/ah, or a 10-Gigabit EPON (10G-EPON).

In order to describe an apparatus and a method for resetting a transimpedance amplifier for a passive optical network according to an embodiment of the present disclosure, an uplink burst signal reception scheme in the PON will be first described.

Figure 4:
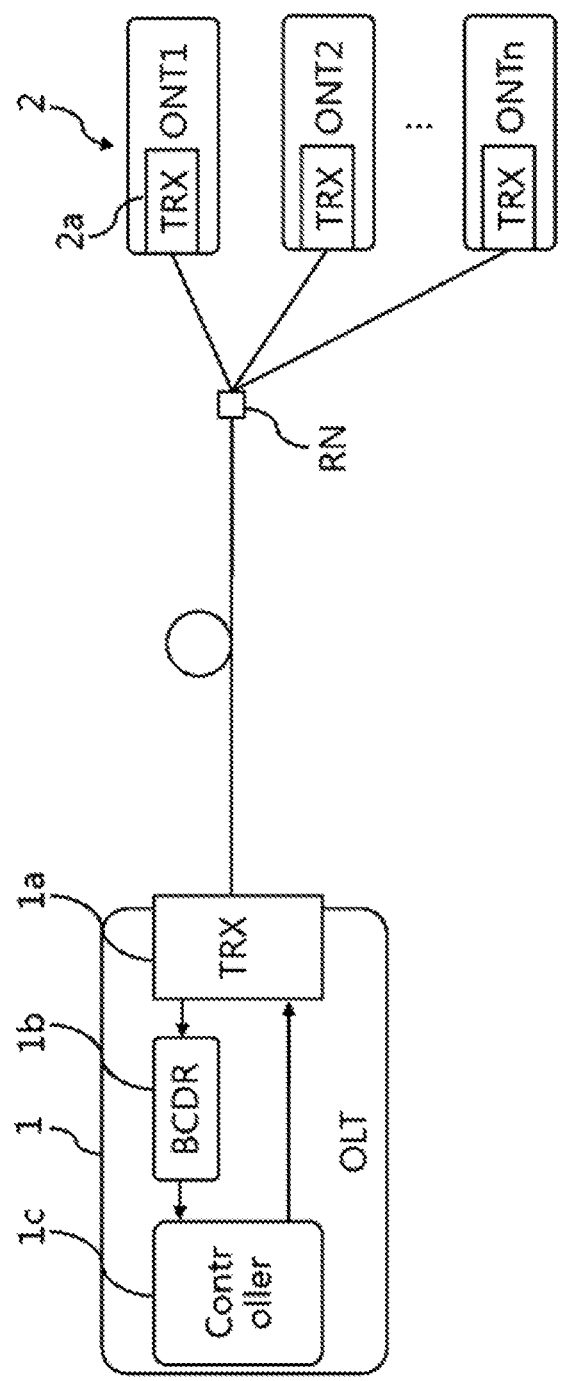
FIG. 4 is a conceptual diagram illustrating an uplink signal reconstruction scheme of the passive optical network.

FIG. 4 is a conceptual diagram illustrating an uplink signal reconstruction scheme in the passive optical network. As illustrated in FIG. 4, through the Remote Node (RN), the Optical Line Terminal (OLT) 1 including the optical transceiver 1a for mutually converting an electric signal and an optical signal is connected to the plurality of Optical Network Terminals (ONTs) 2 via the optical transceivers 2a. Downlink signals and uplink signals between the OLT and the ONTs correspond to 1:N communication using a signal optical line, and thus signal management and synchronization in different ways are needed. Due to this characteristic, the uplink signals are required to avoid collision between N ONTs 2.

Accordingly, the uplink signals are sequentially transmitted according to a schedule allocated to each ONT 2, and a guard time is applied in order to avoid signal collision between signals of the respective ONTs 2.

The uplink signals are transmitted as burst signals. An internal clock used by the OLT 1 and an internal clock used by each ONT 2 are different from each other and also have different delay times due to a transmission line, so that the OLT 1 uses a burst-mode clock and data reconstruction (BCDR) unit 1b to identify received frame data by reconstructing a predetermined ONT clock applied to the received uplink burst signal.

Since the BCDR unit 1b must reconstruct uplink data using different clocks every time, the BCDR unit 1b consumes a predetermined time to reconstruct clocks. The clocks may be reconstructed using preambles (generally scores to hundreds of 32-bit or 64-bit preambles) generally included in the uplink signals. Accordingly, a controller 1c for performing control and signal processing, for example, an Application-Specific Integrated Circuit (ASIC) or a Field-Programmable Gate Array (FPGA), may not receive uplink frame data until the operation of the BCDR unit 1b for clock reconstruction (locking).

The performance of the BCDR unit 1b improves further when the noise of the received uplink signal is lower, but in practice, a considerable number of preambles should be repeatedly transmitted and a guard time should be sufficiently configured in order to guarantee the clock reconstruction provided from the remote ONTs in the 1:N manner. Accordingly, the bandwidth of the uplink signal is significantly reduced compared to the downlink signal.

Figure 5:
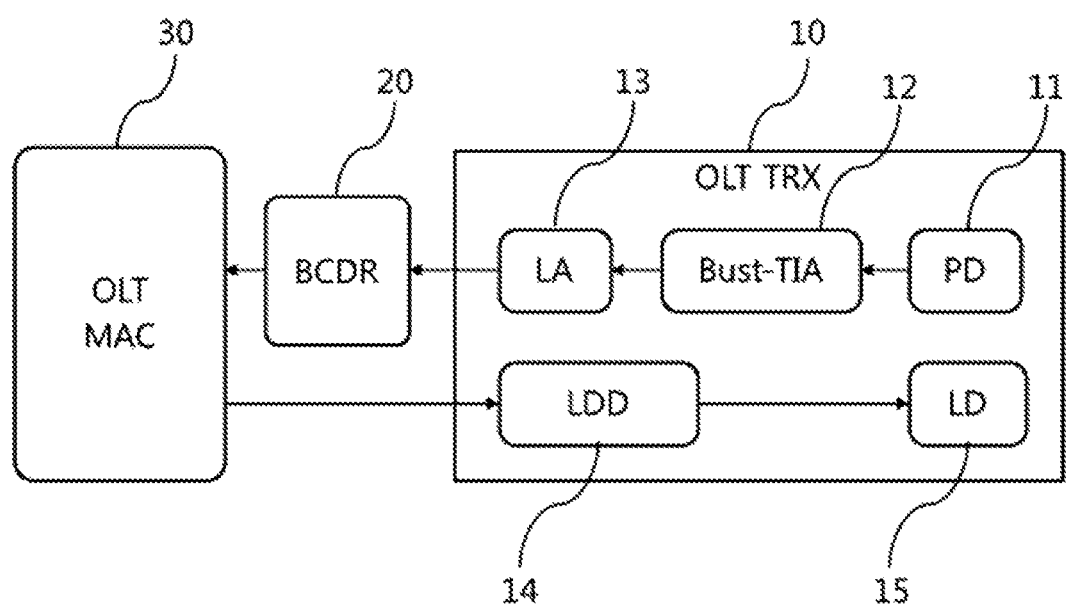
FIG. 5 is a diagram illustrating uplink/downlink signal transmission/reception of the passive optical network.

FIG. 5 is a diagram illustrating uplink/downlink signal transmission/reception in the passive optical network. As illustrated in FIG. 5, an OLT optical transceiver 10 includes a laser diode driver 14 and a laser diode 15 for internally converting a downlink signal into an optical signal, a photo diode 11 for converting the uplink signal from the optical signal to a current signal, a burst-mode transimpedance amplifier (burst-TIA) 12 for converting the output current of the photo diode 11 into a voltage and amplifying the output current, and a Limiting Amplifier (LA) 13 for amplifying the signal to be output by a desired swing.

In the case of the uplink burst signal, the signal amplified through the LA 13 of the optical transceiver 10 is transferred to the BCDR unit 20, and the corresponding BCDR unit 20 reconstructs the clock based on repeated preamble information from the received signal, reconstructs data according to the corresponding clock, and then provides the data to an OLT Media Access Control (MAC) processing unit 30 corresponding to the controller.

Figure 6:
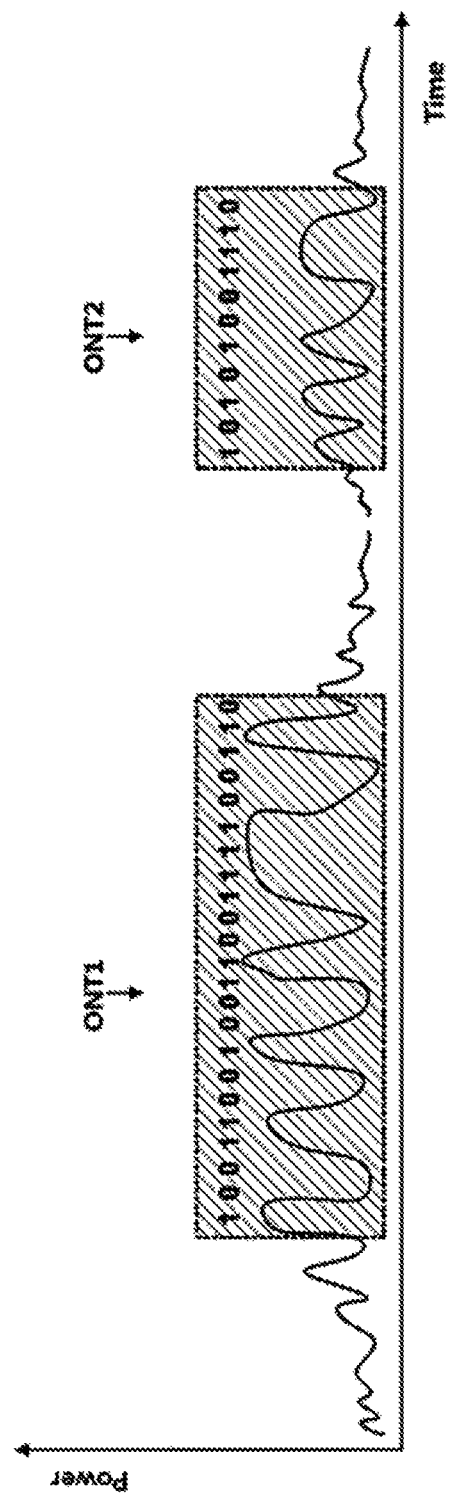
FIG. 6 is a conceptual signal graph illustrating a reception state of an uplink signal received by an OLT.

An uplink signal processing process using this configuration will be described below in more detail. The uplink signals received by the photo diode 11 of the optical transceiver 10 have the form of segmented burst signals of different scales received from a plurality of ONTs, as shown in the conceptual graph of FIG. 6. The signal illustrated in FIG. 6 is for description of a concept, and thus portions thereof may be exaggerated or downscaled such that a signal part corresponding to an actual frame is shown as being significantly reduced. Further, bit values on the upper portion are actual outgoing bit values of the received signal for reference.

As illustrated in FIG. 6, optical signals received from a plurality of ONTs have different sizes (scales or ratios) and are not connected to each other, and each signal includes preceding and subsequent noise.

The reason why each signal includes preceding and subsequent noise is that a first noise interval, attributable to a laser diode (LD) turn-on time of the ONT optical transceiver for converting an electric signal of uplink burst frame data into an optical signal, and a PD turn-on time, during which the photo diode 11 of the OLT optical transceiver 10 receiving the optical signal converts the optical signal into an electrical signal, and a last noise interval, attributable to an LD turn-off time of the ONT optical transceiver and a PD turn-off time of the photo diode 11 of the OLT optical transceiver 10, are included.

Since the signals having different sizes and including preceding and subsequent noise are received in the disconnected state, the burst TIA 12 should variably amplify the signals. The burst TIA 12 amplifies the amplified signals by a swing width divisible through the LA 13 and provides the signals to the BCDR 20, and the BCDR 20 divides the corresponding signal into 1 and 0, searches for an appointed preamble, reconstructs the clock, and then reconstructs bit information of data using the corresponding clock.

Figure 7:
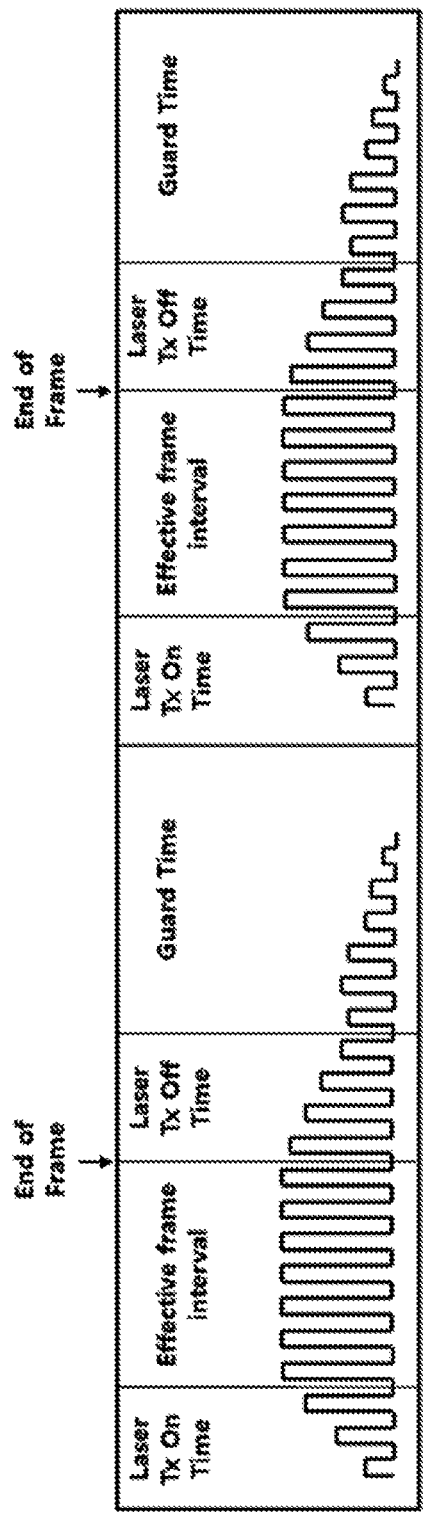
FIG. 7 is a conceptual diagram illustrating the state in which an uplink signal is converted into bit information.

FIG. 7 is a conceptual diagram illustrating the state in which an uplink signal is converted into bit information. As illustrated in FIG. 7, frame bits reconstructed by the BCDR 20 are shown.

As illustrated in FIG. 7, a signal interval (including initial noise and some preambles) for a laser turn-on time, an effective frame data interval of actual frame data (frame data including preambles), a signal interval for a laser turn-off time, and a guard interval including signals generated in a predetermined period are included.

It is ideal for frame data to be detected only in the effective frame interval, but realistically, noise generated during a laser turn-on process in a laser turn-on time and noise data of some of initial preambles are included, and there is also noise generated in part of a laser diode turn-off interval and a guard time after actual frame transmission is completed. One of the reasons why it takes a lot of time to reconstruct clocks and data by the BCDR unit 20 is a noise signal generated after the effective frame interval. Since noise signals are generated for a such a long time due not only to original noise generated while laser diodes are turned off but also to noise attributable to a capacitance component accumulated during a variable amplification process of the burst TIA 12, it is difficult for the BCDR unit 20 to reconstruct the clocks and data.

Accordingly, if the time point at which actual received frame data ends can be precisely known, the noise signals generated after the actual frame ends can be significantly reduced by resetting the burst TIA 12 to remove the capacitance component of the burst TIA 12. When the noise signals are significantly reduced, it is possible to reduce a clock and data reconstruction time of the BCDR unit 20 (reduce the number of required preambles by reducing a training time using preambles) and also reduce a guard time, thereby expanding a bandwidth or saving power.

To this end, the OLT MAC processing unit 30 may detect the time point at which the frame ends by identifying information on frame data bits received from the BCDR unit 20 through frame data analysis and then transfer a reset signal to the burst TIA 12 of the optical transceiver 10. However, in order to generate the TIA reset signal, the OLT MAC processing unit 30 should analyze the received frame data at a higher level, identify the meaning of the frame data, and then generate the reset signal immediately after detecting the end time point, and thus burdens itself with processing thereof and causes a predetermined delay for analysis of the frame data, so that timing is somewhat delayed. Above all, such a scheme cannot be applied to the OLT repeater having no MAC layer processing means capable of analyzing the frame data at a higher level.

Accordingly, an embodiment of the present disclosure provides the configuration of a new reset signal generator which can detect the exact time point at which the frame ends by identifying the received frame data at a frame data bit level without any analysis by a MAC layer and provide the reset signal to the burst TIA of the optical transceiver.

Figure 8:
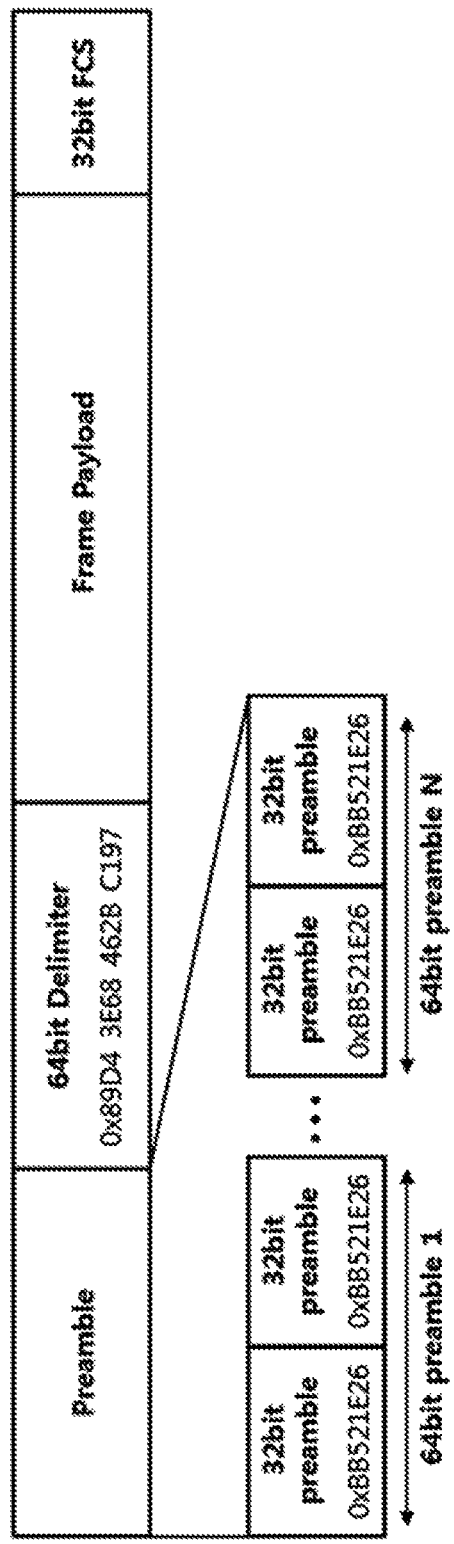
FIG. 8 is a frame diagram illustrating the configuration of an uplink data frame.

FIG. 8 is a diagram illustrating an example of an uplink data frame, and the illustrated configuration is one of burst profiles of commercial equipment for the actual XGPON.

As illustrated in FIG. 8, the frame includes a preamble field used as training information for the BCDR in which a plurality of repeating unit preambles exists, a delimiter field that indicates the start of an actual frame, a frame payload field, and a frame checksum field.

Preambles of the illustrated profile include preambles having 32-bit unit information, and bit changes a predetermined number of times or more in order to reconstruct clock data of the BCDR. Considering this characteristic, there are a pattern of "0101 . . . 01", in which a bit change is largest, and a recommended pattern of "0xBB521E26" in the ITU recommendation. When clock data is completely reconstructed at a predetermined level or higher through repetition of the pattern a predetermined number of times and thus a stable state is entered, the state is changed to a "locking-on" state in a BCDR circuit block, and then a frame start point is found by comparing a delimiter pattern. Accordingly, 64-bit preambles in which a 32-bit preamble pattern is repeated two times are repeated N times, but may be repeated scores or hundreds of times for the safe BCDR. For example, in a structure repeating 120 times, 7680 bits (about 768 nanoseconds in a 10-Gbps PON structure) is transmitted as a preamble bit value for the BCDR.

In this frame configuration, information on an actual frame length (for example, a frame bit length after the delimiter) is inserted into at least one appointed area among the preamble field and the delimiter field, the information is detected at a frame bit level, and the number of frame data bits received after the delimiter is counted, and thus the time point at which the frame ends is identified and the reset signal is generated.

Figure 9:
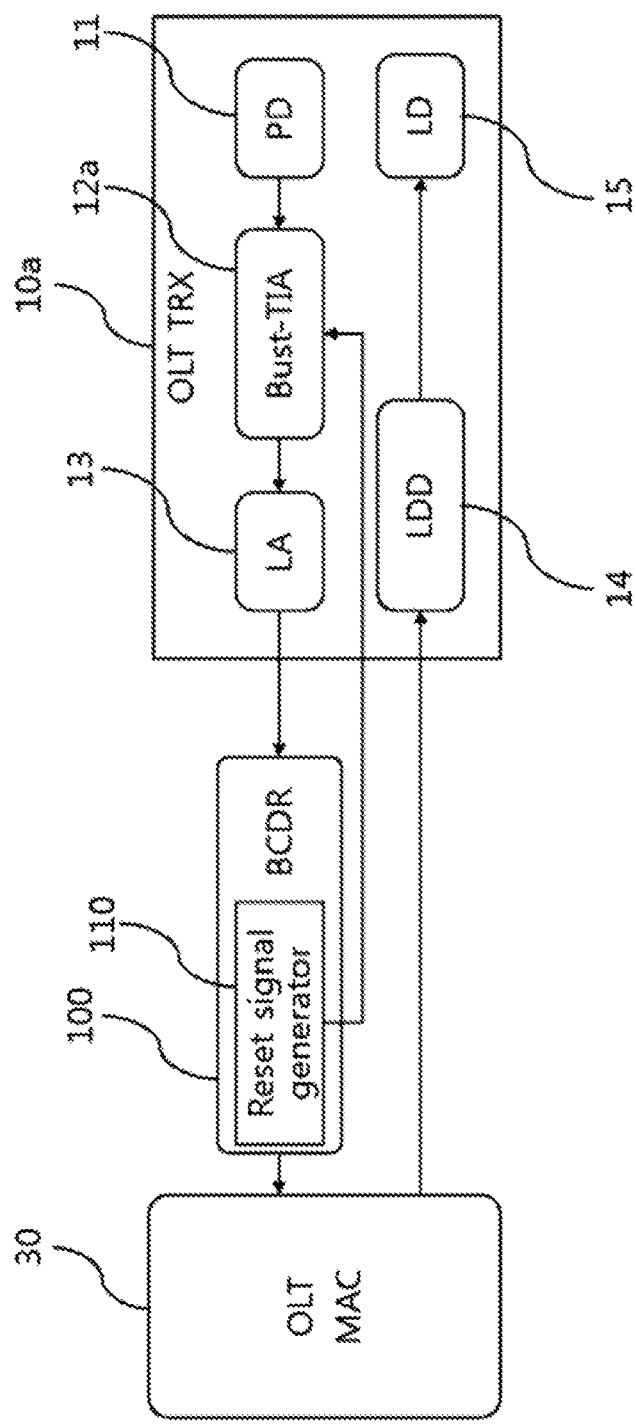
FIGS. 9 and 10 illustrate the configuration of embodiments to which the present disclosure is applied.

FIG. 9 illustrates an example of the configuration according to an embodiment to which the present disclosure is applied. As illustrated in FIG. 9, a reset signal generator 110 is added to a BCDR unit 100 for reconstructing frame data and identifying data bit information, and the reset signal generator 110 detects the time point at which the frame ends at a frame data bit level before a frame data analysis process and provides the reset signal to a burst TIA 12a of an OLT optical transceiver 10a. That is, the reset signal generator 110 simply detects a preamble bit pattern and a delimiter bit pattern preset in the burst profile at a received data bit level without using the OLT MAC processing unit 30, extracts frame length information inserted into the appointed location, and then identifies a frame length value. Thereafter, the reset signal generator 110 determines the time point at which the frame ends through the number of received frame data bits (determines based on the number of bits or the number of bytes/words, which are higher units of bits) and generates a reset signal, so that a rapid and precise reset signal generator having low processing load may be configured. Particularly, the reset signal generator 110 may be configured in the form of a single chip as part of the BCDR unit 100.

The burst TIA 12a of the OLT optical transceiver 10a removes the capacitance component by resetting a circuit according to the reset signal and thus reduces noise signals generated after the frame data ends.

Figure 10:
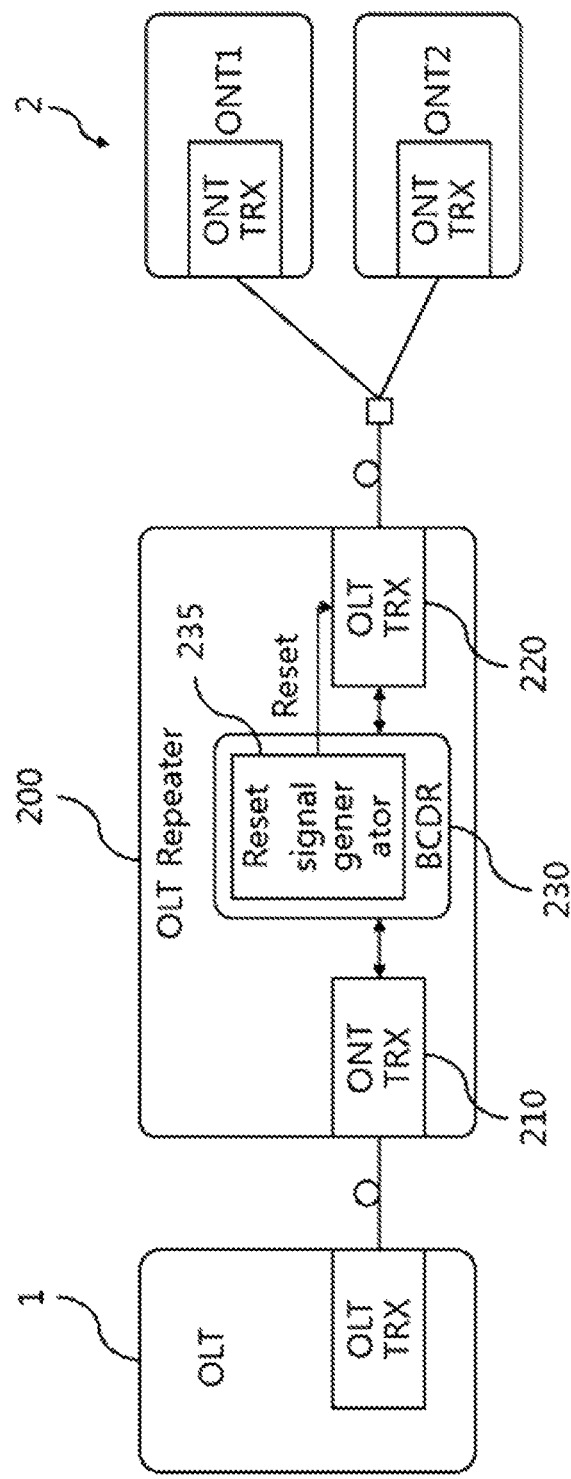

FIG. 10 illustrates an example of the configuration according to another embodiment to which the present disclosure is applied, in which the reset signal generator is applied to an OLT repeater 200 used to extend a transmission distance.

As illustrated in FIG. 10, the OLT repeater 200 is configured to receive uplink burst signals from ONTs through an OLT optical transceiver 220, reconstruct received frame data through a BCDR unit 230, and then relay optical signal to the OLT 1 through an ONT optical transceiver 210. Since the OLT repeater 200 does not have the MAC layer processing configuration for analyzing the frame, even though frame data is reconstructed, the time point at which the frame ends cannot be recognized from the corresponding data. However, through a reset signal generator 235 in the BCDR unit 230, it is possible to detect the time point at which the frame ends at the bit level of the frame data and provide the reset signal to the burst TIA of the OLT optical transceiver 220 according to an embodiment of the present disclosure.

As the burst TIA circuit of the OLT optical transceiver 220 is reset according to the reset signal, the capacitance component may be removed, and noise signals generated after the frame data ends may be reduced.

Figure 11:
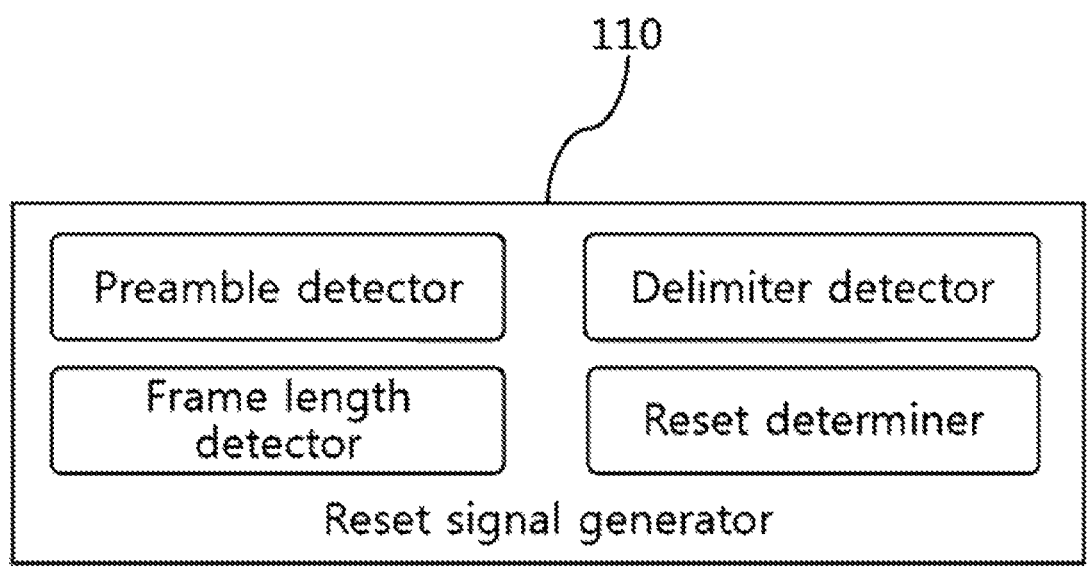
FIG. 11 is a diagram illustrating a reset signal generator according to the present disclosure.

FIG. 11 illustrates the configuration of the reset signal generator applied to FIGS. 9 and 10 above.

As illustrated in FIG. 11, the reset signal generator 110 includes a preamble detector for detecting a bit pattern of preambles repeatedly inserted into a received frame based on data bit information of the received frame reconstructed from a received uplink burst signal; a delimiter detector for detecting a delimiter bit pattern following preambles of the received frame, a frame length detector for detecting frame length information included in appointed locations of one or more of a preamble and a delimiter (that is, an area before the frame payload), and a reset determiner for generating a reset signal for resetting a transimpedance amplifier included in the optical transceiver at the time point at which the received frame ends through the frame length information and the delimiter detected by the delimiter detector.

The frame length detector detects one or more pieces of frame length information included in the appointed location, and the frame length information may include a frame length value coded in a preset scheme, and may further include an error correction code. Accordingly, the frame length detector may acquire bit information of an appointed length at the appointed location as the frame length information and decode the bit information or identify the error through the error correction code and correct the error. Of course, after inserting a plurality of pieces of frame length information, the frame length detector may calculate a frame length value from each piece of frame length information through decoding and error correction and then comparing the frame length values, thereby acquiring a reliable frame length value.

The frame length value coded in the preset scheme may be acquired using a simple scrambling coding scheme or a Bose-Chaudhuri-Hocquenghem (BCH) coding scheme including a frame length value and an error correction code.

Meanwhile, in addition to determining the location of the time point at which the received frame ends through the frame length information, the reset determiner may further identify whether the actual frame ends by additionally identifying a frame end marker inserted into the end of the frame or added to a frame checksum (FCS), which is the last field of the frame. This will be described in more detail with reference to FIG. 16.

The reset signal generator may be formed with an electric circuit including various electronic elements, an electronic circuit including a micro controller programmed to perform a corresponding function, or an integrated circuit such as an ASIC or an FPGA.

FIGS. 12A and 12B illustrate a comparison between the case in which the burst TIA included in the OLT optical transceiver is reset according to a reset signal of the reset signal generator according to an embodiment of the present disclosure and the case in which there is no conventional burst TIA reset process.

As illustrated in FIGS. 12A and 12B, when there is no separate burst TIA reset configuration, a noise signal is generated for a considerably long time even after an effective frame interval in which the frame ends, as illustrated in FIG. 12A, so that the ratio of the effective frame interval to the total signal area is low, and thus BCDR efficiency becomes lower. As a result, the repetitive length of the preamble for the BCDR becomes longer, and a guard time cannot be reduced.

However, when the generation of the signal by residual capacitance is blocked by resetting the burst TIA at the time point at which the frame ends, as illustrated in FIG. 12B according to an embodiment of the present disclosure, the conventionally generated noise signal, as well as short noise due to turning off of the laser, can be significantly reduced. Accordingly, BCDR efficiency is improved by the significant increase in the ratio of the effective frame interval to the total signal area, and thus the repetitive length of the preamble for the BCDR can be reduced and the noise signal is not generated during the guard time, so that the guard time can be reduced and the bandwidth increases.

Meanwhile, the frame length information is inserted into appointed areas of the preamble field or the delimiter field of the frame and is detected in FIGS. 9 to 11 according to an embodiment of the present disclosure described above, and a detailed embodiment thereof will be additionally described with reference to FIGS. 13 and 14.

Figure 13:
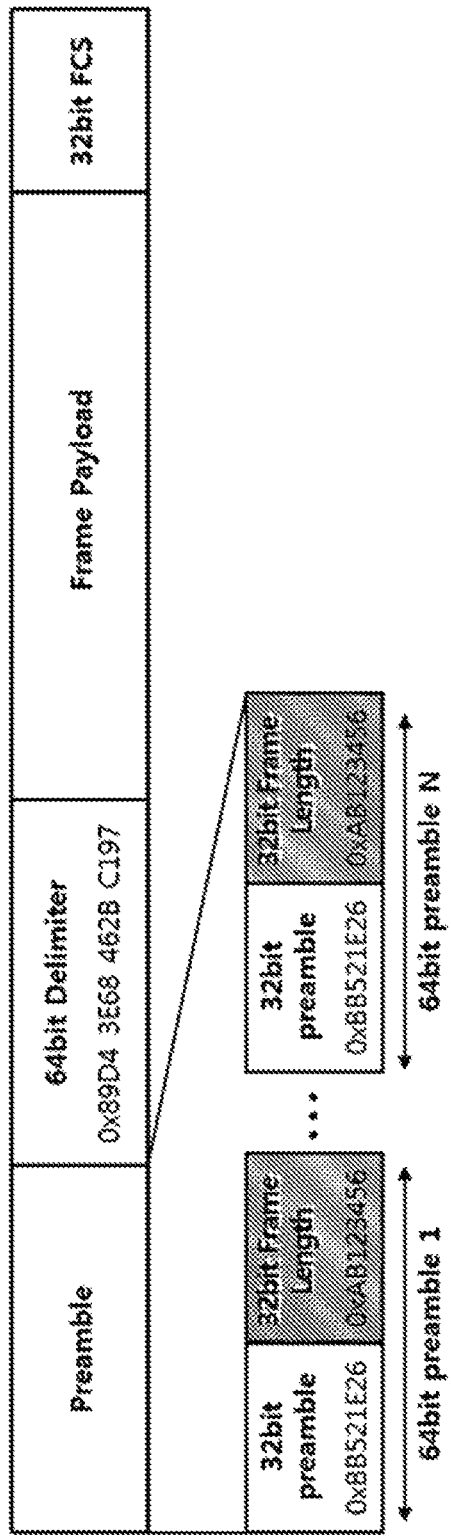
FIGS. 13 to 15 illustrate the frame configuration including frame length information according to embodiments of the present disclosure.

FIG. 13 illustrates an example of a scheme of alternately providing frame length information and a preset unit preamble according to an embodiment of the present disclosure.

When the 32-bit preamble defined as the burst profile is, for example, 0xBB521E26, the corresponding preamble and frame length information of 32 bits are alternately provided. Unlike the training bit pattern (a preset value of the unit preamble), which is configured to make the BCDR easy since pieces of bit information of 0 and 1 are relatively uniformly distributed, the frame length information (frame length value) is highly likely to have non-uniform bit information, which may influence a BCDR process, and thus it is preferable to convert the form to be easy for training through a scrambling process in order to make bit information uniform and then to insert the converted frame length information. That is, in the configuration of recommended frame length information expressed as 32 bits, "1" and "0" may be expressed averagely a similar number of times by performing scrambling in order to overcome the phenomenon in which the BCDR lock (locking-on state) is released due to successive generation of the same repetitive values (Consecutive Identical Digits (CID)). Of course, frame length information coded through types of coding other than scrambling may be inserted.

In the example shown, the frame length information may be 0xAB123456, and the insertion location corresponds to 32 bits (alternately) between respective unit preambles (0xBB521E26) known through the burst preamble, and thus 0xBB521E26 may be detected through pattern comparison with the received frame bits, and the following 32 bits may be detected as frame length information. Meanwhile, since the 32-bit preamble and the frame length information are alternately repeated, the frame length information may be verified through the repeated information and an accurate value may be detected.

When the frame length information is detected, the actual frame length value may be calculated through a descrambling algorithm corresponding to the appointed scrambling algorithm. The frame length information may be information on the number of bits of the frame after the delimiter (or the number of bytes or words consisting of bits). Since the delimiter has delimiter values (64 bits or 32 bits) of some types for distinguishing frame types in the burst profile, a delimiter location may be recognized in received frame data bits through bit pattern matching. Thereafter, the time point at which the frame ends may be recognized by counting frame data bits received next to the delimiter and comparing the frame data bits with the frame length.

Meanwhile, the delimiter value on the burst profile in the embodiment shown may be 0xB9D43E68462BC197 of 64 bits, and two different values may be defined according to whether Forward Error Correction (FEC) is actually used.

For example, referring to a predetermined commercial burst profile, the 64-bit delimiter may be defined as 0xB9D43E68462BC197(FEC on) or 0xB7521F0648ADE879(FEC off) and the configuration of the frame may be identified through the delimiter.

Broadly, the configuration of the frame into which the frame length information scrambled in the preamble is inserted according to the present disclosure may be identified through the delimiter.

For example, four different predetermined values may be determined, and the four determined values may correspond to FEC on, FEC off, including scramble frame length information and FEC on, and including scramble frame length information and FEC off.

Accordingly, the configuration of the received uplink burst signals can be identified. Further, this is compatible with the conventional configuration, and a new function according to the present disclosure can be selected, so that the bandwidth can increase if the new function is selected.

Figure 14:
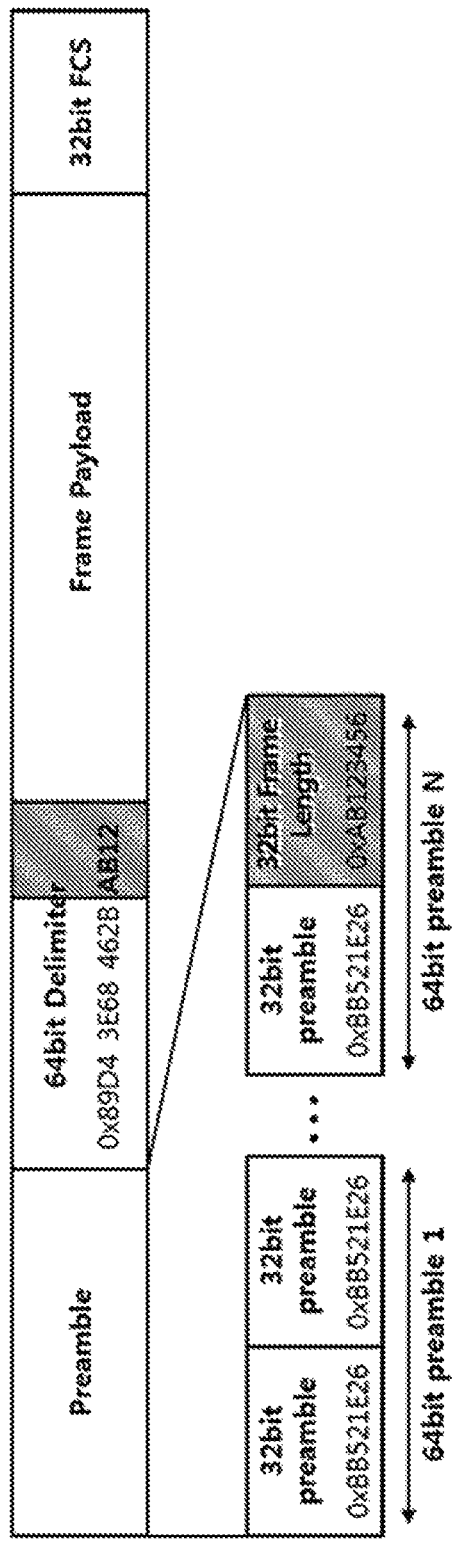

FIG. 14 illustrates an example of the configuration of the frame including frame length information according to another embodiment of the present disclosure, and shows two cases at the same time.

The first case corresponds to a method using the conventional preamble configuration, which changes as little as possible, by inserting the frame length information once (or several times) instead of the last preamble. The preamble pattern is detected and then is continuously compared with received frame data bits. When a different bit pattern is detected and a value different from the delimiter is received, the value may be used as frame length information. Alternatively, the delimiter may be detected while the received frame data bits are buffered, predetermined bits before the delimiter (for example, one or n pieces of 32-bit frame length information) may be selected, and the selected bits may be used as frame length information. Of course, the corresponding frame length information may be scrambled or inserted as information coded through a different type of coding scheme, as described above, and the actual frame length value may be acquired by descrambling or decoding the frame length information. Thereafter, the time point at which the frame ends may be identified by comparing the number of the frame data bit following the delimiter and the frame length value.

In another way, the frame length information is inserted using predetermined bits following the 64-bit delimiter. In the case of the delimiter, 32-bit information may be used according to the type of the burst profile. Accordingly, the 64-bit delimiter is defined, and then the 32-bit delimiter may be used, or only a value for 48 bits of the 64-bit delimiter may be used, and the remaining 32 bits or 16 bits may be used for providing the frame length information. For example, the value of the 64-bit delimiter on the profile may be 0xB9D43E68462BC197, in which case the frame length information may be inserted instead of C197, which are the last 16 bits. The corresponding frame length information may be scrambled information as described above, or may be inserted through a scheme on the basis of C197 such as being added to the originally defined C197 or performing an XOR operation. Even in the case of 16-bit information, the information corresponds to $2^{16}$ and thus allows appointment of the frame bit length up to 65535 bits. Moreover, in the case of units of bytes or words, it is possible to appoint a more sufficient length.

In the two schemes described with reference to FIG. 14, information indicating that the frame length information is included in frame data may be specified by adding delimiter types as described with reference to FIG. 13 above.

Meanwhile, as well as the two schemes described with reference to FIG. 14, simple modifications such as inserting frame length information between preambles or configuring a separate frame length information field between a preamble and a delimiter or between a delimiter and a frame payload can be made, but such modifications are the same as operation principles of the present disclosure, and thus may be considered as the same actual configuration.

Figure 15:
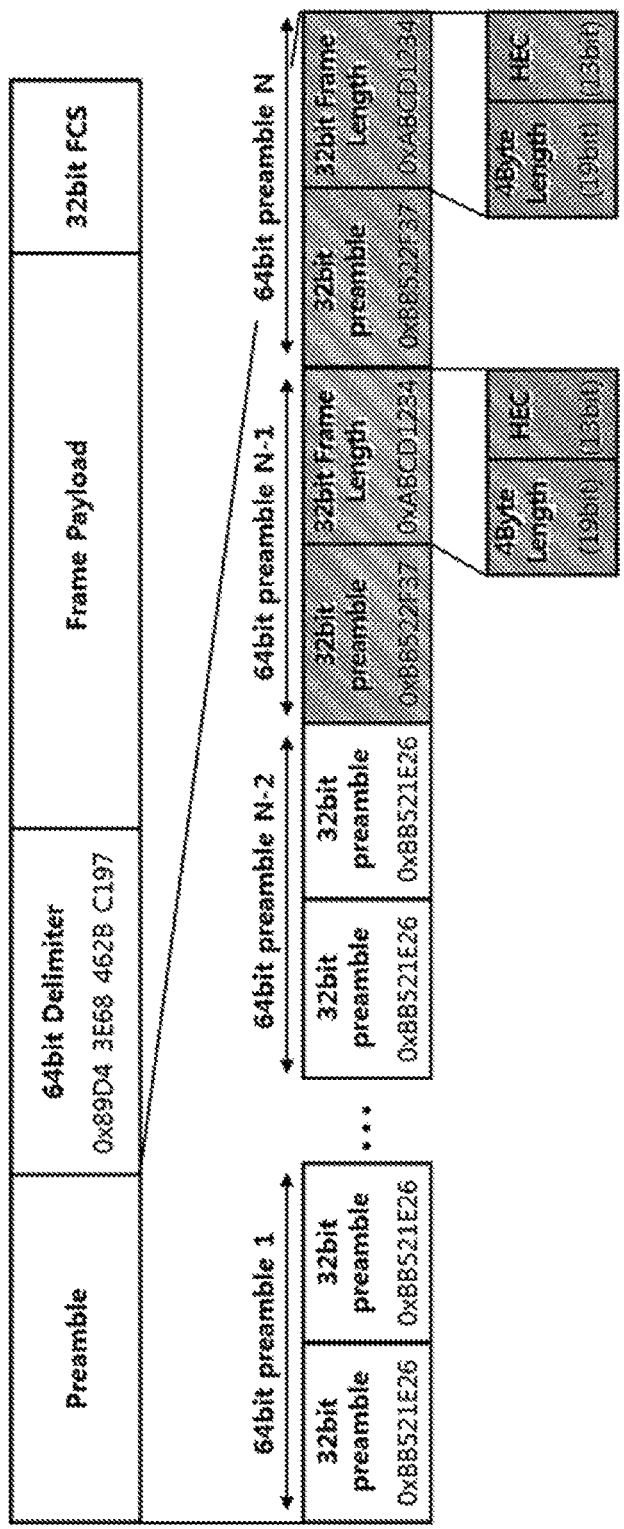

Particularly, FIG. 15 illustrates an example of the configuration of the frame including frame length information according to another embodiment of the present disclosure and is an embodiment that is highly reliable and thus further suitable for commercialization.

As illustrated in FIG. 15, in order to indicate provision of frame length information at the last part of the repetitive 32-bit unit preamble (for example, 0xBB521E26), a 32-bit index preamble (for example, 0xBB522F37) having a value different from the unit preamble and 32-bit frame length information are provided. The number of 64-bit frame length preambles including the index preambles and the frame length information may be plural (two in the example shown) in order to stably identify the frame length information. The last two of N 64-bit preambles (consisting of two 32-bit unit preambles) are actually provided as 64-bit frame length preambles including the frame length information, but it may be conceived that two pieces of 64-bit information are added to N-2 64-bit preambles to provide two pieces of frame length information. In practice, the two cases may be considered to be the same as each other.

Meanwhile, the 64-bit frame length preambles added to the preamble field area include the 32-bit index preamble and the 32-bit frame length information, as illustrated in FIG. 15. Bose-Chaudhuri-Hocquenghem (BCH) coding may be applied to the frame length information. BCH coding is used to transmit a PON identifier (ID), and may be divided into a 19-bit area to provide 4-byte length information and a Hybrid Error Correction (HEC) code area to correct errors. Since it is possible to reliably calculate a frame length value by correcting a reception error based on the frame length information and to verify the calculated frame length value several times (through a plurality of 64-bit frame length preambles), a reliable frame length value can be secured at the frame data bit level. Of course, in order to calculate the frame length value, the frame length detector described in FIG. 11 must be configured to detect a bit pattern of the index preamble, which is defined differently from the unit preamble, detect subsequent frame length information, and then calculate a frame length value without error based on the frame length value included as the frame length information and on an error correction code, and the frame length value must be verified by repeating the calculation of the frame length value for a plurality of 64-bit frame length preambles.

Through this method, it is possible to stably generate a reset signal for the burst TIA by inserting reliable frame length information into frame data, transmitting the frame data, and detecting the frame length information at a frame data bit level in an actual environment.

Figure 16:
FIG. 16 is a frame diagram including information on an index of the time point at which a frame ends according to an embodiment of the present disclosure.

FIG. 16 illustrates an example of the configuration of the frame including information on an index of the time point at which the frame ends according to an embodiment of the present disclosure. As illustrated in FIG. 16, the end of the frame may be identified by inserting a frame end marker to the last part of the frame, by which a frame end point can be intuitively detected, or by changing a frame checksum (FCS), which is the last part of the frame.

When the frame end marker (FEM) is inserted into the last part of the frame, the time point at which the frame ends can be just identified if the reset signal generator identifies the frame end marker. However, since data having the same value may be included in the frame payload, it is preferable to include frame length information in the front part of the payload in order to identify the actual location of the end of the frame. The frame end marker may also be concomitantly used to verify the time point at which the received frame data ends. For example, when a portion of the data is lost due to frame data reception errors or when the amount of data is increased due to noise, the detection of the time point at which the frame ends based on the frame length information may be incorrect. Accordingly, the location of the end of the frame can be more accurately detected by identifying the frame end marker near the time point at which the frame ends.

Meanwhile, the frame end location can be verified as the reset determiner of the reset signal generator calculates the FCS in the payload part of the frame based on actual frame length information through the frame checksum (FCS) and then searches for the last FCS in order to determine the identity thereof.

When the ONT transmits the frame in another way and the FCS is deliberately configured to contain a specific error, the OLT or the reset signal generator of the OLT repeater may calculate the FCS in the payload part of the received frame and then compare the FCS with FCS information of the real frame, thereby identifying whether the FCS includes the deliberate error.

It will be understood by those skilled in the art to which the present disclosure pertains that various changes and modifications may be made to the above-described contents without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An apparatus for resetting a transimpedance amplifier for low-power passive optical network equipment, the apparatus comprising:
   a reset signal generator configured to generate a reset signal based on data bit information of a received frame reconstructed from an uplink burst signal received through an optical transceiver,
   wherein the reset signal generator includes:
   a preamble detector configured to detect a bit pattern of preambles repeatedly inserted into the received frame;
   a delimiter detector configured to detect a bit pattern of a delimiter following the preambles of the received frame;
   a frame length detector configured to detect frame length information included in appointed locations of at least one of the preambles and the delimiter; and
   a reset determiner configured to generate a reset signal for resetting the transimpedance amplifier, the transimpedance amplifier being included in the optical transceiver at a time point at which the received frame ends based on the frame length information and the delimiter detected by the delimiter detector.

2. The apparatus of claim 1, wherein the reset signal generator is included in an Optical Line Terminal (OLT) or a burst-mode clock and data reconstruction unit of an OLT repeater.

3. The apparatus of claim 1, wherein the frame length information includes a frame length value coded in a preset scheme and further includes an error correction code.

4. The apparatus of claim 1, wherein the frame length information is inserted in a predetermined location of repetitive preambles of a preset length, the frame length information having a length equal to the preset length, or the frame length information is alternately provided with one or more pieces of frame length information of the preambles having appointed information, the frame length information having a length equal to a length of the preambles.

5. The apparatus of claim 1, wherein the frame length information is inserted into last 16 bits of a 64-bit delimiter.

6. The apparatus of claim 1, wherein the delimiter is distinguished by a plurality of determined values for dividing a case in which the frame length information is not inserted and a case in which the frame length information is inserted.

7. An apparatus for resetting a transimpedance amplifier for low-power passive optical network equipment, the apparatus comprising:
  a preamble detector configured to detect a bit pattern of unit preambles repeatedly inserted into a received frame;
  a frame length detector configured to
    detect a bit pattern of index preambles differently defined from the unit preambles, the index preambles being located in a preamble field of the received frame,
    detect subsequent frame length information, and
    calculate a frame length value through the subsequent frame length information and an error correction code;
  a delimiter detector configured to detect a bit pattern of a delimiter of the received frame; and
  a reset determiner configured to, when a time point at which the received frame ends is determined using the frame length value and a location of the delimiter detected by the delimiter detector, generate a reset signal for resetting the transimpedance amplifier, the transimpedance amplifier being included in an optical transceiver.

8. The apparatus of claim 7, wherein the reset determiner verifies the time point at which the received frame ends by detecting a frame end marker added to an end of the received frame or verifies the time point at which the received frame ends by calculating a frame checksum of the received frame and comparing the frame checksum with a frame checksum value located at the time point at which the received frame ends.

9. A method of resetting a transimpedance amplifier for a low-power passive optical network equipment, by which, when a received uplink burst signal is converted into data bit information through a burst-mode clock and data reconstruction process, a reset signal generator generates a reset signal for resetting the transimpedance amplifier, the transimpedance amplifier being included in an optical transceiver based on corresponding data bit information, the method comprising steps of:
  detecting preambles having an appointed bit pattern from reconstructed data bit information of the uplink burst signal and detecting one or more pieces of frame length information included in appointed locations before a payload of the frame;
  detecting delimiters in an appointed bit pattern from the reconstructed data bit information of the uplink burst signal and detecting a time point at which the frame ends by comparing a number of data bits subsequent to the detected delimiters with the detected frame length information; and
  generating a reset signal for resetting the transimpedance amplifier at the detected time point at which the frame ends.

10. The method of claim 9, wherein the reset signal generator is included in an OLT or a burst-mode clock and data reconstruction unit of an OLT repeater.

11. The method of claim 9, wherein the frame length information includes a frame length value coded in a preset scheme and further includes an error correction code.

12. The method of claim 9, wherein an index preamble different from the unit preamble is located at a front part of the frame length information in order to indicate that the frame length information follows.

* * * * *